Patented Nov. 14, 1922.

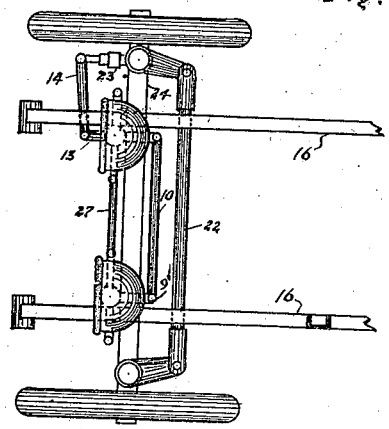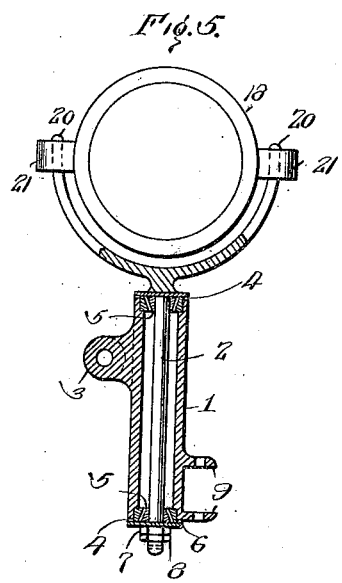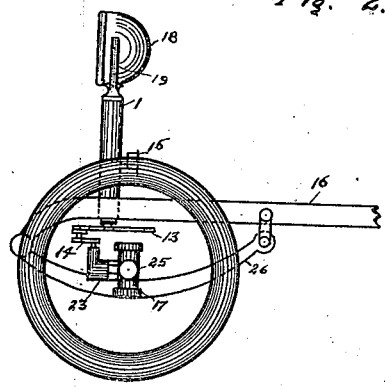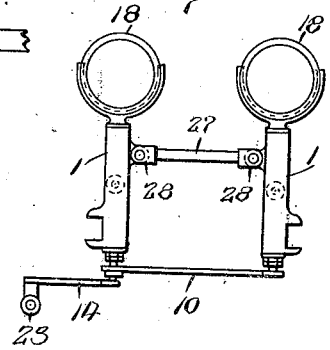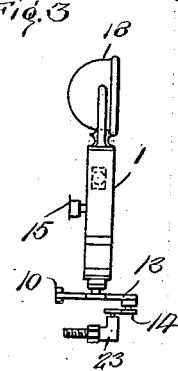

1,435,504

UNITED STATES PATENT OFFICE.

GUSTAV ADOLPH SCHAPER, OF NEW YORK, N. Y.

AUTOMOBILE HEADLIGHT.

Application filed February 9, 1922. Serial No. 535,353.

*To all whom it may concern:*

Be it known that I, GUSTAV ADOLPH SCHAPER, a citizen of the United States, residing at No. 209 West 97th Street, in the city of New York and State of New York, have invented an Improvement in Automobile Headlights, of which the following is a specification.

My invention relates to the improvement of the automobile head lights, in which both head lights are turned on a pivot in conjunction with the front wheels of the automobile, on same angles with the front wheels; and the objects of my invention are—first to provide a reliable safeguard for the automobile operator, as he knows at all times, in which direction his front wheels of the automobile are turned, especially on dark or country roads, where a wrong turn to either side may mean disaster—second, to provide equal safeguard for all pedestrians on public highways and roads, where crossing of same is necessary; as the direction the automobile is heading for, can be seen at a glance.

I attain these objects by the mechanism illustrated in detail in the following drawings, in which—

Figure 1, is an assembled plan view of the entire operating mechanism and levers attached to the automobile;

Figure 2, is a left side elevation of Fig. 1—showing how the mechanism is worked in conjunction with the front wheels, spindle, spring and chassis frame of the automobile;

Figure 3, is a right side elevation of the improvement, independent, detached from the automobile frame and structure;

Figure 4, is a front elevation of the improvement, independent, of the automobile frame and structure;

Figure 5, is a cross sectional view of the head light pillar or column arrangement, showing its construction and the sensitive roller bearing supports, for free oscillating motion of the head lights.

Similar numerals refer to similar parts throughout the several views.

The lugs 9 9, of the head light pillar or column 1, (see Fig. 5) are bolted onto the automobile chassis frame 16, (see Figs. 1 and 2) the securing rod 27, (Figs. 1 and 4) with yokes 28 28, is fastened into lugs 3 3, of the head light column.

The main pivot bolt 23, is fastened into the front wheel spindle 25, (right side) which when turned, moves with it, the adjustable rod 14, which has a ball knuckle joint on each end, to allow for road deflection and spring resiliency; to rod 14, lever rod 13 is fastened; lever rod 13 connects to the right head light column spindle 2, and then extends to the rear, thence to the head light adjusting rod 10, from rod 10, lever 9' connects to the left head light column spindle 2.

The head light column (see Fig. 5) consists of the following: 1, the pillar or column body, has roller bearings 5 5, one for each end supporting spindle 2, the interior space between the column and spindle is filled with grease, through grease cup 15, (see Fig. 3) on the exterior of each roller bearing 5, is placed felt washer 4 4, to eliminate the dust from entering roller bearings 5 5, a cover 6, is provided for the lower end of the head light column, below which is placed and fitted an adjusting nut 7, and a lock nut below it 8; these nuts 7 and 8 are provided for possible adjustment of wear on roller bearings 5 5; to the top part of the spindle 2 (see Fig. 5) is fastened the lamp fork 19, this fork is made standard size for all lamps, to hold lamp 18.

The assembled views Figures 1 and 2 is the improvement attached to the automobile chassis frame, ready for use, and the following numerals are explained to ascertain in what position and connection therewith the improvement relates.

The chassis frame 16, is connected through the goose neck to spring 26, to this spring 26, is secured the front axle 24; to this front axle 24, is fastened the front wheel spindles 25, and to the right side front wheel spindle of the automobile, this improvement is attached and adjusted.

The front wheel aligning or tie rod 22, (see Fig. 1) does not connect directly with this improvement, and is merely shown, to show that the above described improvement, does not interfere with the present construction of the automobile steering devices on all cars.

I claim:

The combination with a vehicle comprising a frame, a front axle and spindles at the ends of the axle, hollow posts secured to the vehicle frame, a spindle revolubly mounted in each column and carrying a lamp at its upper end, a lever attached to the lower end of each spindle, a rod connecting the rear ends of said levers, one of said levers having a forwardly projecting arm; a stem secured into one of the front wheel spindles and provided with an elbow, a steering rod, and ball knuckle joints connecting the ends of the steering rod with the elbow and the end of the forwardly projecting arm respectively.

In testimony that I claim the foregoing as my own, I have hereto affixed my signature.

GUSTAV ADOLPH SCHAPER.